US005822705A

United States Patent [19]

Lehtola

[11] Patent Number: 5,822,705

[45] Date of Patent: Oct. 13, 1998

[54] APPARATUS FOR CONNECTING A RADIOTELEPHONE TO AN EXTERNAL ANTENNA

[75] Inventor: Antero Lehtola, Turku, Finland

[73] Assignee: Nokia Mobile Phones, Ltd., Salo, Finland

[21] Appl. No.: 682,158

[22] Filed: Jul. 17, 1996

[30] Foreign Application Priority Data

Sep. 26, 1995 [FI] Finland .................................... 954552

[51] Int. Cl.[6] ........................................................ H04B 1/38

[52] U.S. Cl. ............................ 455/575; 455/90; 455/129; 343/702

[58] Field of Search ................................ 455/89, 90, 129, 455/269, 280, 282, 277.1, 281, 128, 127, 193.1, 95, 97, 99, 575, 41; 343/702, 703, 856

[56] References Cited

U.S. PATENT DOCUMENTS

| | | | |
|---|---|---|---|
| 4,521,784 | 6/1985 | Nemet | 343/846 |
| 4,660,047 | 4/1987 | Wolfson et al. | 343/700 |
| 4,661,992 | 4/1987 | Garay et al. | 455/89 |
| 5,155,494 | 10/1992 | Bryant et al. | 343/713 |

FOREIGN PATENT DOCUMENTS

| | | |
|---|---|---|
| 0 399 975 | 11/1990 | European Pat. Off. . |
| 84536 | 8/1991 | Finland . |
| 2 266 997 | 11/1993 | United Kingdom . |
| WO 91/01577 | 2/1991 | WIPO . |
| WO 96/19845 | 6/1996 | WIPO . |

*Primary Examiner*—Andrew I. Faile
*Assistant Examiner*—Christopher Onuaku
*Attorney, Agent, or Firm*—Perman & Green, LLP

[57] ABSTRACT

The present invention concerns an apparatus for connecting a radio frequency signal between the integral antenna of the radio communication device and the external antenna, preferably a car antenna. The apparatus in accordance with the invention comprises a resonant element, preferably a helical coil conductor having an electromagnetic coupling with the antenna of the radio communication device and its first connection point being coupled capacitatively with the ground plane of the radio communication device and its second connection point being connected with a coaxial conductor to said external antenna. The apparatus in accordance with the invention further comprises a matching element, preferably a helical coil conductor coupled electromagnetically to said antenna and said resonant element.

11 Claims, 6 Drawing Sheets

APPARATUS FOR CONNECTING A RADIOTELEPHONE TO AN EXTERNAL ANTENNA

BACKGROUND OF THE INVENTION

The present invention concerns an apparatus for connecting a radio communication device, preferably a mobile phone of a cellular network, to an external antenna. The invention is preferably applicable to connecting a mobile phone to a car antenna.

To improve the usability of a mobile phone in a car, it is known in the art to use the so called car antenna outside the vehicle body, the mobile phone to be used in a car being connected to said antenna by means of a coaxial cable one end of which is provided with an RF connector. To this end, the mobile phone of prior art must have a counterpart of the said RF connector. The integral mobile phone antenna must in that case be disconnected, either by means of an automatic contact breaker linked with the said counterpart of the RF connector or by the user using a separate contact breaker, so that no disturbances and losses would be caused by the simultaneous use of the integral antenna and the car antenna.

The said RF connector with its counterpart can form e.g. a usual coaxial connection based on a galvanic coupling, but this kind of solution is exposed to oxidation, dirt and wearing. Known in the art there is the Finnish patent publication No. 84536 and the corresponding EP publication No. 0 399 975 that describe a solution, where the RF coupling between the mobile phone and the connector of the car equipment is provided capacitively through an equivalent pair of metal plates. This solution solves the above mentioned oxidation, dirtying and wearing problems, but it does not eliminate the need of a separate RF breaker for switching off the integral antenna of the mobile phone during car use.

Known in the art there is the Patent No. GB-2 266 997 providing a solution in accordance with FIG. 1, where connector B including a resonant element C is attached by means of a hook-and-loop type fastener or the like to the housing of the mobile phone A for a car use. By connecting the connector B to the mobile phone A, the said resonant element C is brought so close to the integral antenna D of the mobile phone that it has an electromagnetic coupling with the antenna and starts to resonate, so that it absorbs the RF power emitted by the mobile phone antenna D and transmitted by the coaxial cable E further to the car antenna. One drawback of this solution is the dependence of the connection between the mobile phone antenna D and the resonant element C on their mutual location. Also, the external resonant element loads the mobile phone antenna electrically, whereby its resonance frequency falls and the coupling on the upper part of the frequency band to be used gets weaker.

An object of the present invention is to provide an apparatus for connecting a radio communication device, preferably a mobile phone of a cellular network, to an external antenna so that the above mentioned drawbacks associated with the solutions of prior art could partly be avoided and partly reduced. Another object of the present invention is to provide an apparatus for connecting the radio communication device to an external antenna without a separate change-over switch of the antenna. A still further object of the present invention is to provide an apparatus for implementing the above mentioned coupling with minor losses.

The object of the present invention can be attained by a construction releasably attached to the radio communication device, said construction comprising a resonant element, an earthing element and a matching element connected with each other in a way described in more detail in the following.

The apparatus according to the present invention comprising a resonant element and signal transmission means, said resonant element comprising a first and a second connection point, is characterized in that it has means for connecting the first connection point of said resonant element to the ground potential plane and means for connecting the second connection point to said signal transmission means.

The invention is based on the idea that by means of an earthing element coupling capacitatively to the ground plane of the radio communication device and by means of a matching element coupled to the resonant element, a matching can be arranged for the resonant element that is coupled electromagnetically to the mobile phone antenna, through which the dependence of the coupling on the mutual location of the resonant element and the mobile phone antenna and also the transmission loss of the coupling can be considerably decreased.

The construction in accordance with the present invention will be described in more detail in the following in the light of one exemplified embodiment, with reference to the accompanying drawings, wherein

Figure 1A:
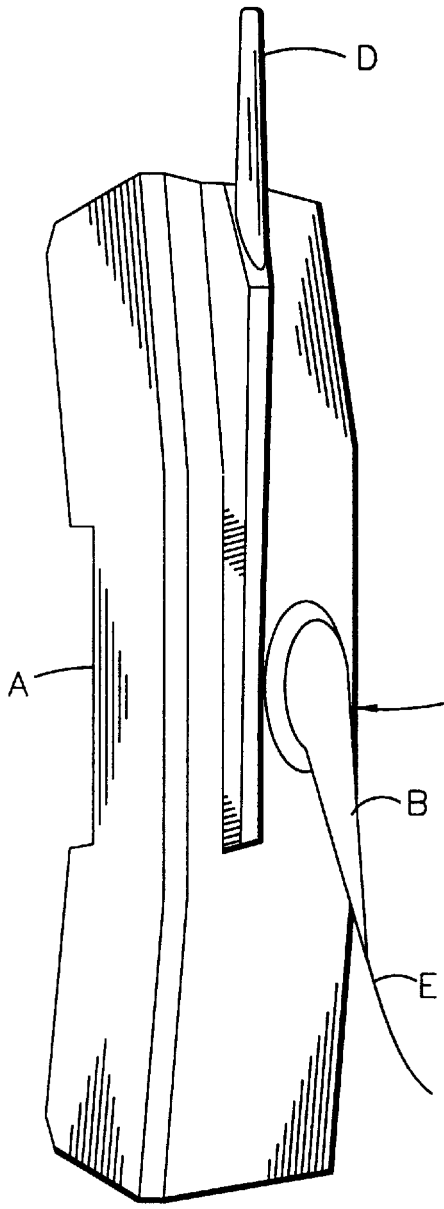
FIG. 1A PRIOR ART
FIG. 1 illustrates a known construction, where a resonant element is attached to the housing of the mobile phone in order to achieve an electromagnetic coupling between it and the mobile phone antenna.
Figure 1B:
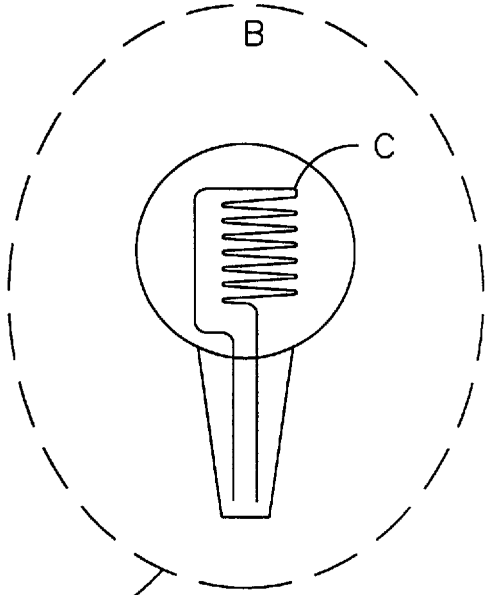

DETAILED DESCRIPTION OF THE PREFERRED EMBODIMENT:

The construction of prior art according to FIG. 1 was described in the foregoing, so that in the following, the embodiments of the present invention will be described primarily with reference to figures from 2 to 5. In the figures of the drawings the corresponding elements are identified by the same reference numbers. In the following, the radio communication device in connection of which the apparatus according to the present invention is used, will be referred to as a mobile phone.

Figure 2:
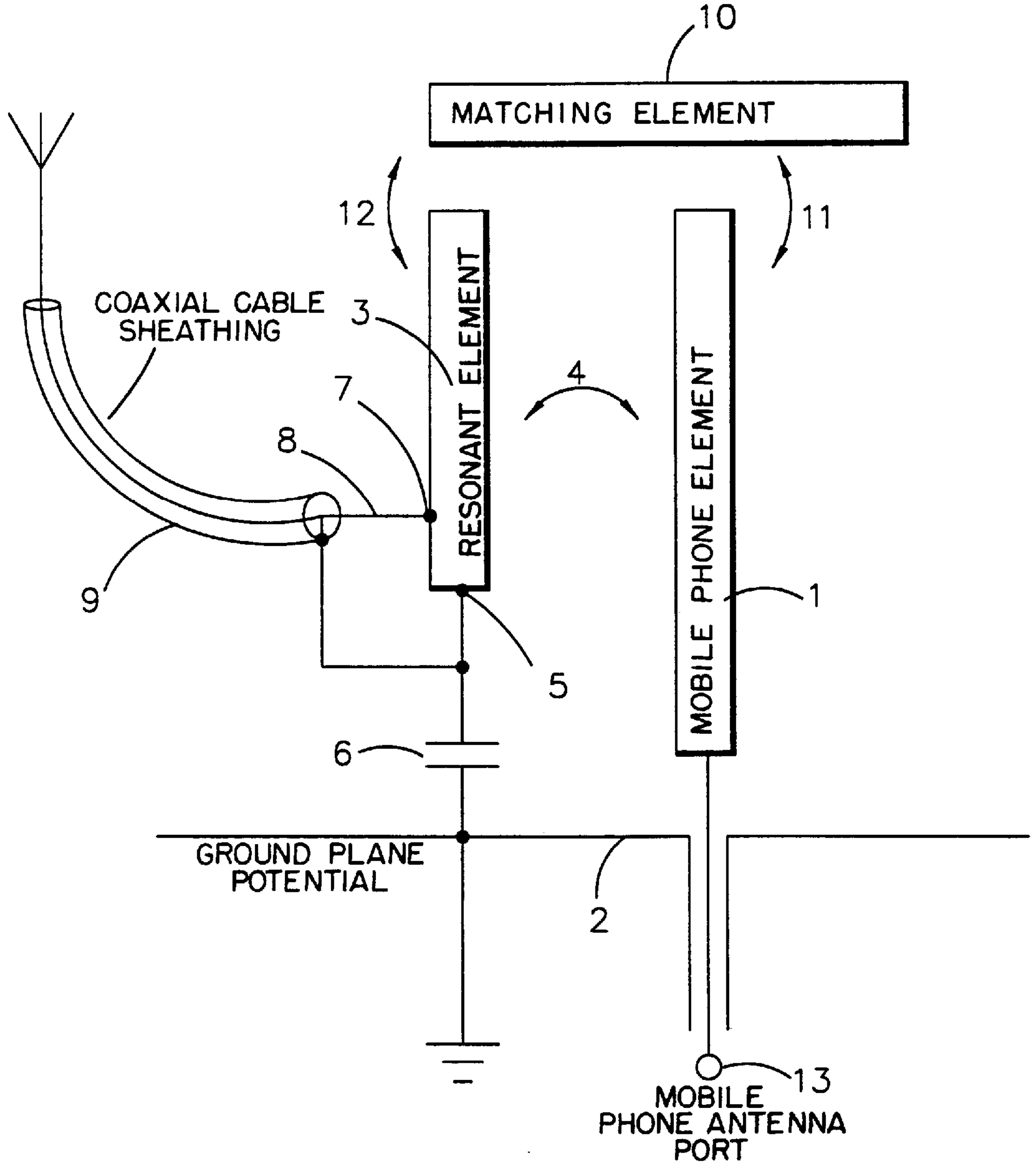
FIG. 2 is a circuit diagram of a connection arrangement according to the present invention.

In FIG. 2 the connection arrangement according to the present invention is illustrated as a circuit diagram. In the diagram there is the antenna 1 of the mobile phone, preferably a helical coil conductor, forming a helix antenna in the proximity of the ground potential plane 2 of the mobile phone. According to the invention, a resonant element 3 will be disposed near the antenna, the resonant element also being preferably a helical coil conductor and its electric length being preferably a quarter of the used wavelength. There is an electromagnetic coupling 4 between the mobile phone antenna 1 and said resonant element 3, said coupling being of an inductive nature in the preferred embodiment. The resonant element 3 comprises a first connection point 5 that is in the exemplified embodiment at its lower end, the resonant element being connected therefrom to the ground plane 2 of the mobile phone by a capacitive coupling 6.

The resonant element 3 comprises a second connection point 7, where it is connected to the coaxial cable 8 to transmit the RF power coupled thereto to an external antenna, preferably to a car antenna 17. Instead of a coaxial cable 8 a terminal could be used with a separate conductor connected thereto, or some other signal transmission means known in the art. Location of the second connection point 7 with respect to the ends of the resonant element 3 and specifically with respect to the first connection point 5 is determined so that the impedance of the connection arrangement in accordance with the invention is in the best possible way matched with the impedance of the external antenna. In one preferred embodiment, where the resonant element 3 is a helix, the connection with the coaxial cable 8 is called tapping and it is located about one turn from the earthed end 5 of the helix. The sheath 9 of said coaxial cable is connected through the same capacitive coupling 6 to the ground plane of the mobile phone as the first connection point 5 of the resonant element 3. The capacitive coupling between the ground plane 2 of the mobile phone and the sheath 9 of the coaxial cable prevents the body currents of the mobile phone from emitting disturbance signals.

The connection arrangement in accordance with the invention further comprises a matching element 10 also located in the proximity of the mobile phone antenna 1. It is preferably a resonant element, particularly a helix element, intended for decreasing the transmission loss being present in the arrangement. The matching element 10 couples through an electromagnetic coupling 11 particularly to the mobile phone antenna 1, but also through a somewhat weaker coupling 12 to the resonant element 3, its electrical length being preferably a half of the used wavelength. It decreases radiation losses from the mobile phone antenna and increases the reflection loss of the arrangement in accordance with the present invention both from the direction of the mobile phone antenna port 13 and from the direction of the external antenna 17, which decreases the transmission loss of the arrangement.

Figure 3:
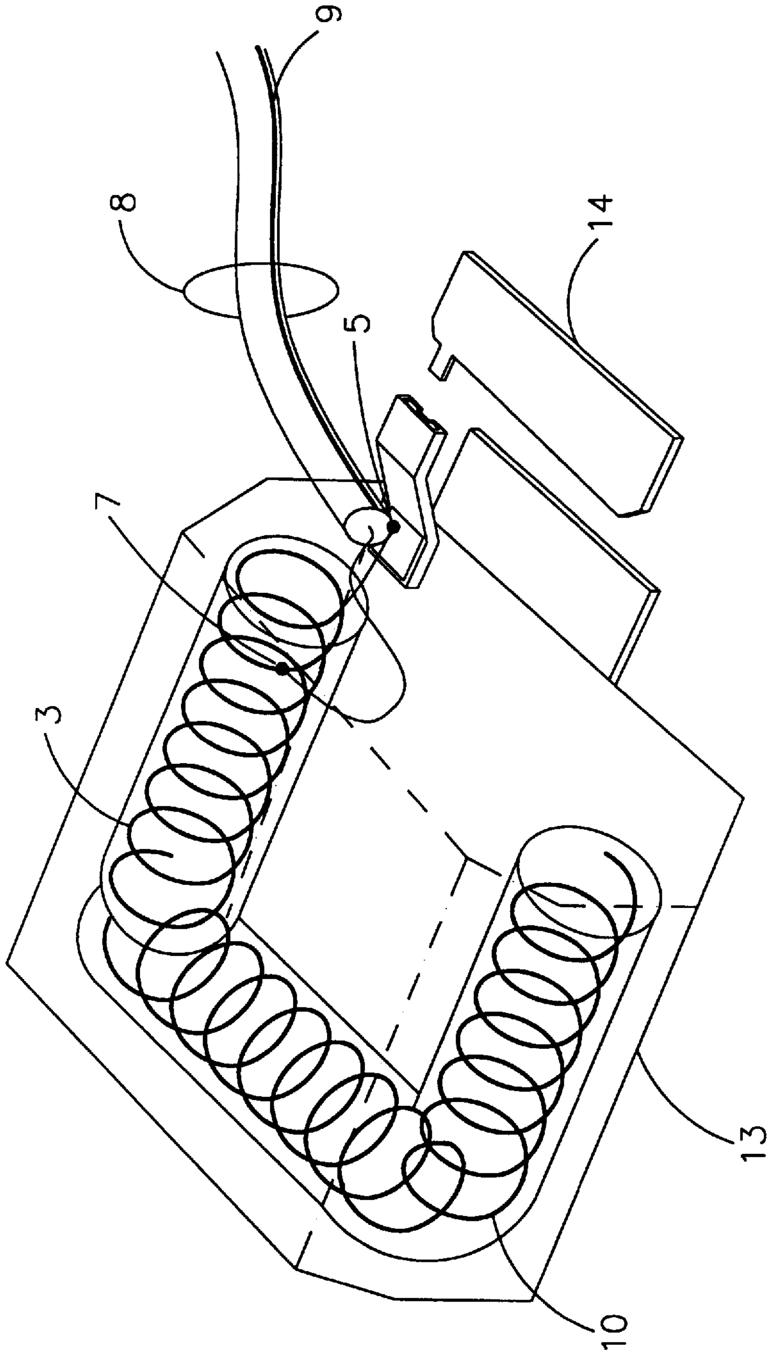
FIG. 3 illustrates the structure of one embodiment of the present invention.

Because the apparatus in accordance with the present invention is intended to be connected with a releasable connection to the mobile phone for use in a car or the like, it must have a compact construction and be connected with the mobile phone preferably trough a mechanical connection as simple as possible. FIG. 3 shows one embodiment, wherein the resonant element 3 and the matching element 10 are helical coil conductors, i.e. helixes. They have been covered by a non-conducting sheath 13 that forms a compact construction. The arrangement also includes an earth plate 14. It has been designed so that when the apparatus according to FIG. 3 is connected to a mobile phone (not shown), the earth plate 14 is in the proximity of some earthed, platelike portion of the mobile phone, so that these two together form a capacitive earth connection indicated in the circuit diagram of FIG. 2 by reference number 6. Aim of the capacitive coupling is to avoid drawbacks of the galvanic coupling described above in connection with the solution of prior art. The coaxial cable 8 is connected to the construction so that its inner conductor is connected to the tapping point 7 of the resonant element 3 and its sheath 9 is connected to the earth plate 14 like also the first connection point 5 of the resonant element. If the electrical length of the earth plate 14 is a quarter of the wavelength, it also attenuates sheath currents transiting otherwise from the resonant element 3 to the antenna lead 8. The connection shown in FIG. 3 by which the earth plate 14 is connected to the rest of the construction is not essential for the invention but it just illustrates one possible implementation.

Figure 4:
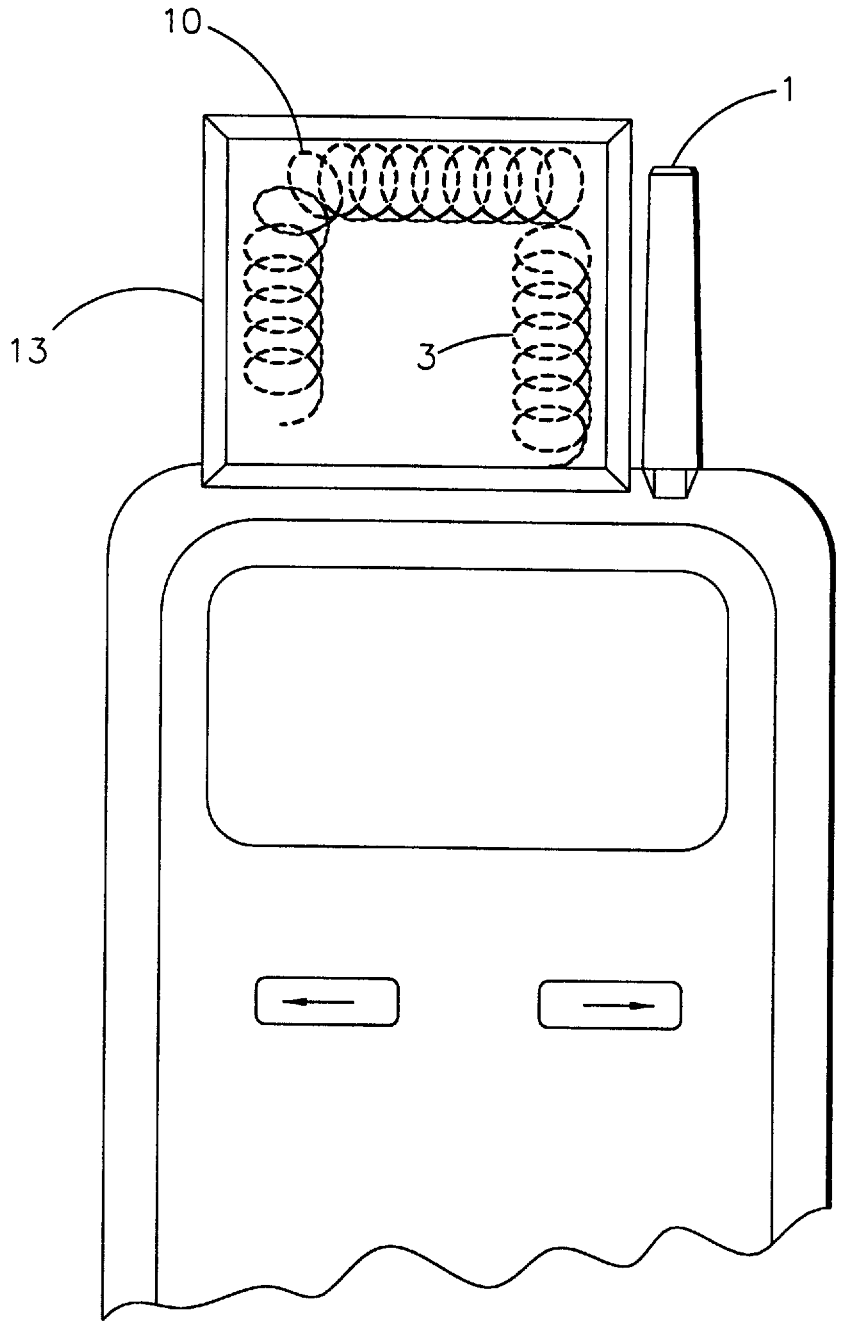
FIG. 4 illustrates schematically the coupling of the embodiment of FIG. 3 to the mobile phone.

In the embodiment of FIG. 3 the matching element is bent into a loop so as to fit it better inside the housing 13 and to make a small construction. When the apparatus according to FIG. 3 is connected to the mobile phone in a way described in FIG. 4, the resonant element 3 will be situated adjacent to the mobile phone antenna 1 and the other end of the matching element 10 comes near the top of the mobile phone antenna 1. In this way the required electromagnetic couplings can be achieved between the different elements.

Figure 5A:
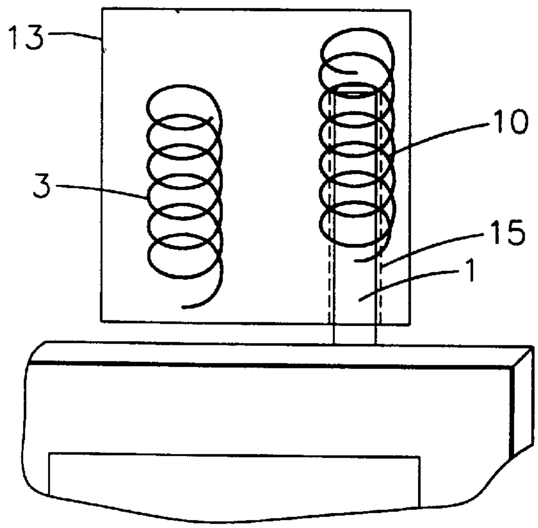
FIG. 5*a* illustrates the structure of a second embodiment of the invention and coupling thereof to the mobile phone.
Figure 5A:
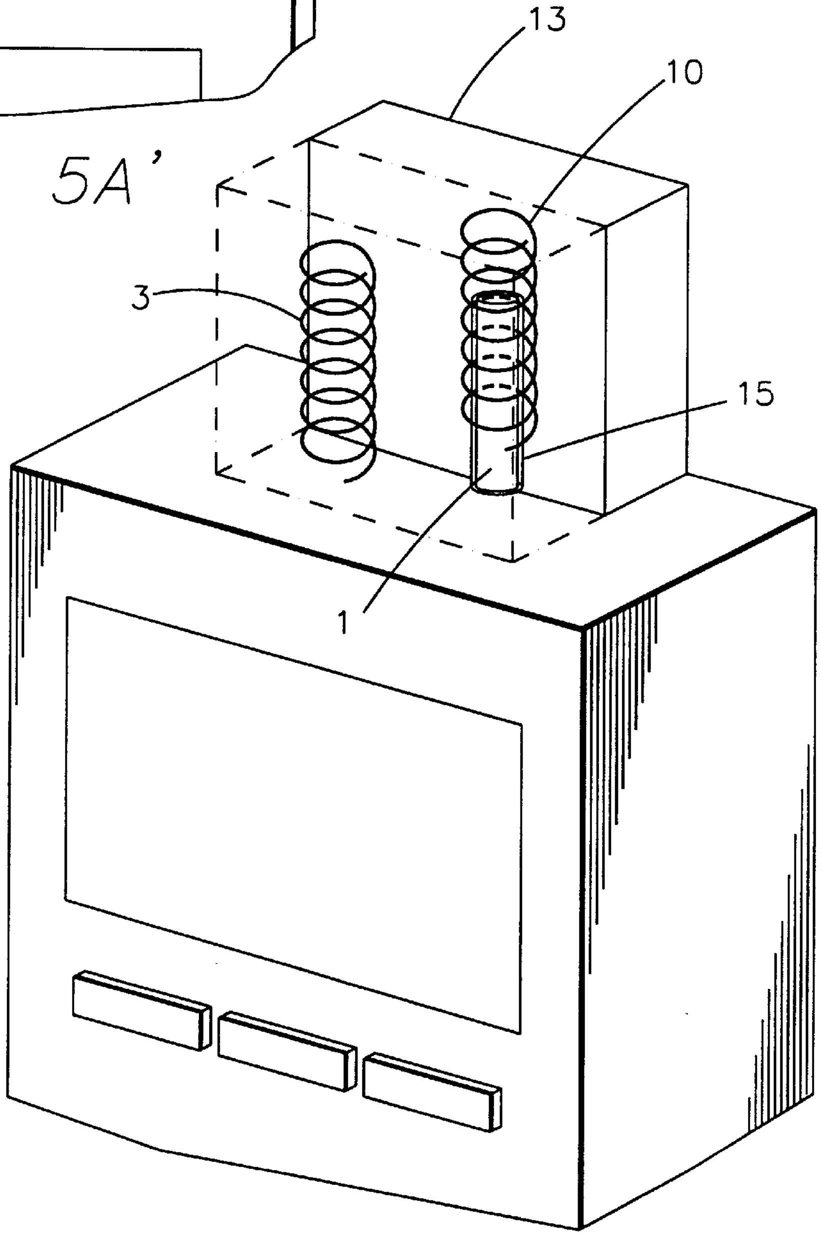
Figure 5B:
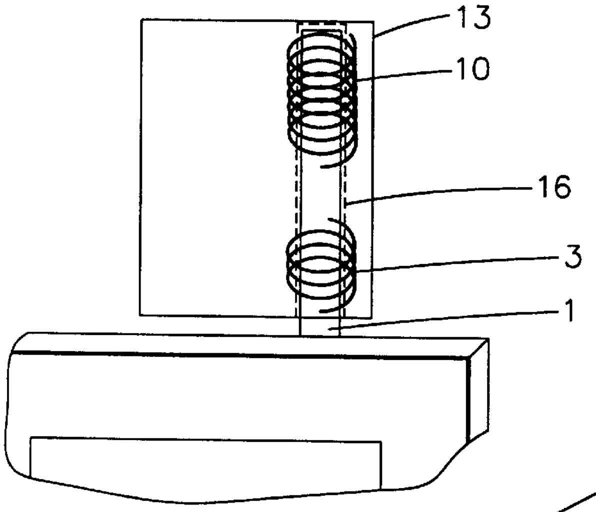
FIG. 5*b* illustrates the structure of a third embodiment of the invention and coupling thereof to the mobile phone.
Figure 5B:
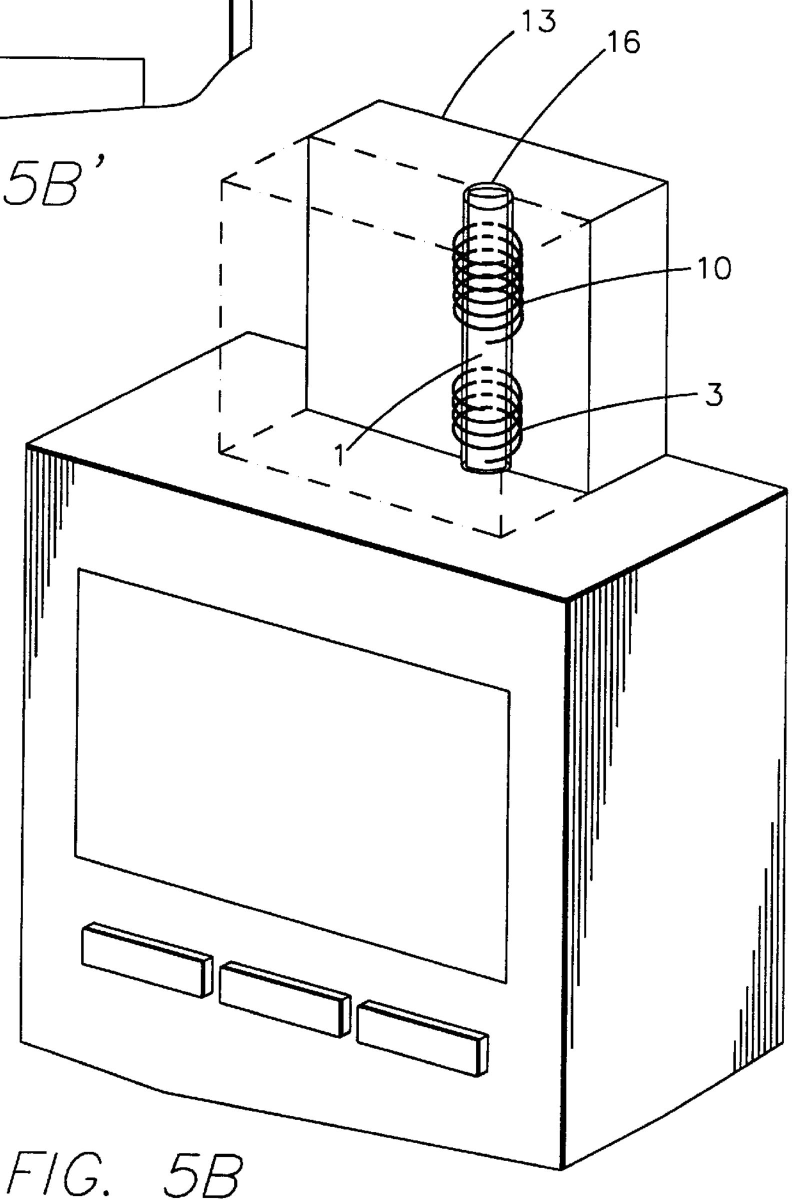

The embodiment of FIG. 3 is not the only way to locate the antenna 1 and elements 3 and 10 mutually in the arrangement according to the present invention. The housing 13 can be designed in accordance with FIGS. 5*a* and 5*b* so that it has a cylindrical recess 15 (FIG. 5*a*) or an aperture 16 (FIG. 5*b*), where the mobile phone antenna 1 is pushed to when the apparatus according to the invention and the mobile phone are fitted together. In this kind of an arrangement either the resonant element 3 or the matching element 10 or both of them can be disposed so that they are situated coaxially with the mobile phone antenna during the operation, either totally or partly overlapping it. In the embodiment of FIG. 5*a* the resonant element 3 is disposed adjacent to the mobile phone antenna 1 and the matching element 10 coaxially with the mobile phone antenna, and partly overlapping it. In the embodiment of FIG. 5*b* both the resonant element 3 and the matching element 10 are positioned coaxially with the mobile phone antenna in a totally overlapping arrangement. Also in the embodiment of FIG. 5*a* the matching element could be bent into a loop for the part that it is not situated around the recess 15 and thus overlapping the mobile phone antenna 1. The embodiments of FIGS. 5*a* and 5*b* only exemplify the mutual position of the antenna 1 and the elements 3, 10 and owing to the clarity the other parts of the apparatus in accordance with the invention have been left out.

The invention is of significant advantage compared with the solutions of prior art. The mobile phone does not have to be equipped with any special components for car use, which decreases production costs of the phone and saves space. The arrangement according to the invention has no connection surfaces exposed to dirt, oxidation or wearing, which improves its reliability in use. With the solution according to the invention, a smaller transmission loss will be gained when connecting the mobile phone to the external antenna than with devices of prior art, and it operates well in the whole frequency range e.g. in the GSM system, for the mobile phones of which it is especially suitable. When the elements mentioned above in the detailed description of the invention are suitably designed, the invention will be applicable to many other systems and to several frequency ranges.

I claim:

1. An apparatus for connecting a radio communication device equipped with a first antenna to a second antenna electric couple, said apparatus comprising a resonant element for transmitting radio power through an electromagnetic coupling between said first antenna and said resonant element, said resonant element comprising a first connection point and a second connection point, and signal transmission means for transmitting the radio power between said resonant element and said second antenna, characterized by means for electrically connecting the first connection point of said resonant element to the ground potential plane of said radio communication device and for connecting the second connection point to said signal transmission means.

2. An apparatus in accordance with claim 1, characterized in, that said means for connecting said first connection point through a capacitive coupling to said ground potential plane include an earth plate, the electric length of which is substantially a quarter of the wavelength that corresponds the operational frequency of said radio communication device.

3. An apparatus in accordance with claim 1, characterized in that it further comprises a matching element, electromagnetically couplable to said first antenna.

4. An apparatus in accordance with claim 3, characterized in that said matching element additionally couples electromagnetically to said resonant element.

5. An apparatus in accordance with claim 1, characterized in that said resonant element is a helical coil conductor, the electric length of which is substantially a quarter of the wavelength that corresponds to the operational frequency of said radio communication device.

6. An apparatus in accordance with claim 3, characterized in that said matching element is a helical coil conductor, the electric length of which is substantially a half of the wavelength that corresponds to the operational frequency of said radio communication device.

7. An apparatus in accordance with claim 1, characterized in that said signal transmission means comprise a coaxial cable, the sheath of which, made of some conducting material, is connected to said first connection point.

8. An apparatus in accordance with claim 1, characterized in that it is attachable to said radio communication device by means of a releasable connection.

9. An apparatus in accordance with claim 1, characterized in that when it is attached to said radio communication device, said resonant element is situated coaxially with said first antenna.

10. An apparatus in accordance with claim 1, characterized in that when it is attached to said radio communication device, said resonant element is disposed in the proximity of said first antenna.

11. An apparatus in accordance with claim 1, characterized in that said matching element comprises a portion that is situated coaxially with said first antenna when said apparatus is attached to said radio communication device.

* * * * *

UNITED STATES PATENT AND TRADEMARK OFFICE

CERTIFICATE OF CORRECTION

PATENT NO. : 5,822,705

DATED : October 13, 1998

INVENTOR(S) : Lehtola

It is certified that error appears in the above-identified patent and that said Letters Patent is hereby corrected as shown below:

IN THE CLAIMS:

In column 4, line 60, before "electric" insert --by--
same line delete "couple" and insert --coupling--
line 65, delete the word "and".

In column 5, line 5, after the word "means" insert --; and--

In column 5, line 5, "delete the". after "means".

In column 5, continue new paragraph --wherein said apparatus comprises means for connecting said first connection point through a capacitive coupling to said ground potential--.

Signed and Sealed this

Thirtieth Day of March, 1999

Attest:

Q. TODD DICKINSON

Attesting Officer

*Acting Commissioner of Patents and Trademarks*